United States Patent [19]

Milligan

[11] Patent Number: 4,519,847
[45] Date of Patent: May 28, 1985

[54] PREVENTION AND REMOVAL OF STAINS IN POOLS AND SPAS

[76] Inventor: Aaron Milligan, 6797 Valinda Ave., Alta Loma, Calif. 91701

[21] Appl. No.: 560,418

[22] Filed: Dec. 12, 1983

[51] Int. Cl.$^3$ ............................................. A45B 25/06
[52] U.S. Cl. ....................................... 134/28; 134/29; 134/42
[58] Field of Search ..................... 134/26–29, 134/40, 42; 210/698, 755

[56] References Cited

U.S. PATENT DOCUMENTS

| | | | |
|---|---|---|---|
| 3,962,497 | 6/1976 | Doty et al. | 134/28 X |
| 4,047,971 | 9/1977 | Yahagida et al. | 134/28 X |
| 4,324,678 | 4/1982 | Howson | 134/42 X |

*Primary Examiner*—Thomas Wyse

[57] ABSTRACT

Cobalt stains which form on fiberglass swimming pools and spas can be removed by washing the fiberglass surfaces with a quantity of a mixture of benzalkonium chloride and EDTA Na4 mixed in a quantity of muriatic acid. The stain removing liquid is brushed onto the fiberglass surface and rinsed therefrom with a high pressure hose. The pool water treated with a mixture of benzalkonium chloride and EDTA Na4 will prevent the formation of cobalt stains on fiberglass pools and spas. A mixture of benzalkonium chloride in water with muriatic acid cuts the acid fumes to a user in cleaning a plaster pool, protects the surface of the pool and acts as a cleansing agent.

2 Claims, No Drawings

PREVENTION AND REMOVAL OF STAINS IN POOLS AND SPAS

BACKGROUND OF THE INVENTION

1. Field of the Invention

The present invention relates to the prevention and removal of stains on the surfaces of swimming pools and spas, particularly cobalt stains on fiberglass pools and spas.

2. Description of the Prior Art

For many years most public and private swimming pools were constructed of poured concrete covered with plaster on the concave surfaces containing the swimming water. More recently, swimming pools had been constructed of fiberglass. Unlike concrete pools, fiberglass pools can be preformed in factories and transported to the location at which the swimming pool is to be installed. Fiberglass swimming pools are far lighter in weight compared with plaster covered concrete pools. The ability to manufacture the structure of the pool from fiberglass and to thereafter transport the pool has markedly reduced the cost of swimming pool construction. Small fiberglass pools can be constructed as unitary structures, while larger pools are typically constructed in sections which are transported to the location at which the pool is to be installed. At the location the fiberglass structures are juxtaposed and bonded together with fiberglass and resin.

Due in large part to the economy with which fiberglass pool structures can be manufactured, fiberglass pools are now installed in a far greater number of residences than was previously the case. Also, fiberglass spas have become quite a popular item in many residential structures. Fiberglass spas and tubs can be manufactured as unitary structures and transported to an installation site with relatively little difficulty. Such spas and hot tubs provide a welcome source of relaxation to many people.

Fiberglass pools, spas and tubs are manufactured from filamentary or chopped strands of glass bonded together by epoxy or polyester resins. The exposed surfaces of fiberglass pools, spas and tubs are typically coated with an overlying gel coat or acrylic layer to provide a hard, protective finish and to provide a smooth, glossy luster to the structure.

One persistent problem with fiberglass pools and spas has been the formation of cobalt stains on the fiberglass surfaces. The cobalt stains are dark splotches on the fiberglass surfaces. Although the splotches resemble and are often mistaken for algae or mildew, they are actually inorganic stains. The formation of such stains has been attributed to the reaction between metals and minerals which are present in tap water used to fill the pools and spas and the fiberglass, resins and gel coat or acrylic finishes on the surfaces of fiberglass pools. The stains which are formed are ink-like splotches. Most fiberglass pools and spas develop such stains and no satisfactory treatment to remove and prevent such stains has heretofore been developed.

Cobalt stains are known in the field of pool maintenance by various names. Among these names are cobalt stains, kobalt staining, brown plaque, black plaque, gel coat plaque, black spotting and black staining. All such terms refer to the same type of stain, and will hereinafter be referred to collectively as cobalt stains.

While cobalt stains are extremely common, and indeed appear in most fiberglass pools and spas, no effective technique of dealing with the problem has heretofore been utilized. Because cobalt stains resemble algae and mildew in appearance, they are often treated as organic in origin. Most aleae treatments employ metal based chemicals. Because cobalt stains result from a reaction of metals in water, the treatment of such stains with chemicals used to control algae merely aggravates the problem.

The only way in which cobalt stains have heretofore been removed has been by sanding. Sanding damages the surface finish of fiberglass pools and spas and harms the appearance. Moreover, sanding requires a considerable time and is therefore quite expensive.

Various chemicals have been devised to cover up cobalt stains. However, the stains are not removed and the surface cover-up detracts from the appearance of the spa or pool.

SUMMARY OF THE INVENTION

One object of the present invention is to provide a substance and method of treatment for removing cobalt stains from fiberglass surfaces.

Another object of the invention is to provide a substance and method for preventing cobalt stains from forming on the surfaces of fiberglass structures, such as swimming pools and spas. Cobalt stains can be prevented by treating the swimming pool water with a unique substance which prevents the formation of cobalt stains and which is harmless, and even beneficial to swimmers and bathers.

Yet another object of the invention is to neutralize the strong chlorine smell characteristic of public swimming pools, and to reduce the harsh body and hair conditions caused by high levels of chlorine while concurrently preventing the formation of cobalt stains.

It has also been discovered, according to the invention, that one of the same substances which is so effective in removing cobalt stains from fiberglass pools is highly beneficial in protecting and cleaning pools and spas with plaster surfaces. Such surfaces are conventionally cleaned with a muriatic acid wash. However, the acid tends to attack the plaster surface so that after only four or five washes, resurfacing is required. Furthermore, conventional acid washing exposes the pool owner or maintenance worker to excessive acid fumes which are unhealthful at best and which can be dangerous.

A substance has been discovered according to the present invention, which can be added to a conventional acid wash material to protect the plaster surface of the pool, and to reduce the hazardous acid fumes, both without reducing the effectiveness of the acid wash. The pool protecting and surface cleaning substance prolongs the life of the plaster finish while aiding especially in cleaning oil and scums from around the tile line of the pool.

It is well known that algae and bacteria in swimming water can be killed by adding chlorine to the water. However, chlorine in swimming water reacts to form chloramines. Chloramines have the characteristic smell and harshness of chlorine, but are ineffective in combating algae and bacteria. Because some of the chlorine in swimming pool water forms chloramines, it is necessary to treat the swimming water with a high level of chlorine so that there is a sufficient amount of active chlorine to combat bacteria and algae. The water treatment substance of the present invention removes chloramines from the water so that only active chlorine remains in the water to combat algae and bacteria. As a result, swimming pool water treated with the cobalt stain prevention substance of the invention will contain a reduced level of chloramines, yet the level of active chlorine in the water remains high.

In one broad aspect the present invention is a stain remover comprised of a mixture of benzalkonium chloride and EDTA Na4 in an inert liquid. The inert liquid used will normally be soft water which is balanced to a pH level of 7.6.

Benzalkonium chloride is N-alkyl dimethyl benzyl ammonium chloride. The organic molecular structure of the N-alkyl dimethyl benzyl ammonium chloride is comprised of:

$C_{14}$—50%; $C_{12}$—40%; and $C_{16}$—10%

Benzalkonium chloride is marketed commercially as Barquat MB-50 by Lonza Inc., 22-10 Route 208, Fairlawn, N.J. 07410. Barquat MB-50 has been marketed as a quaternary ammonium germicide for disinfectant cleaners, sanitizers, viricides, mildew-stats, deodorants and water treatment chemicals. Barquat MB-50 has been approved by the Federal Food and Drug Administration.

Barquat MB-50 has been used for non-medical infections and as a germ control agent.

EDTA Na4 is marketed commercially as Hamprene 220 by the Dow Chemical Company, and may be purchased from A. J. Lynch in Los Angeles, Calif. Hamprene 220 has been used in various applications as a chelating agent.

In another broad aspect the present invention is a pool water treatment substance comprised of a mixture of benzalkonium chloride and EDTA Na4 in an inert liquid. This substance, when added to water in a fiberglass swimming pool or spa will prevent the formation of cobalt stains on the fiberglass surfaces. In addition, in any swimming pool or spa this substance clarifies and freshens the water. It adds a silkiness to the water and removes chlorine harshness. Furthermore, it acts as an infectious germ killer or fighter. The cobalt stain preventer removes chloramines from swimming pool water, but allows active chlorine remaining in the water to combat algae and bacteria.

Preferably, the inert liquid containing the pool water treatment substance is soft water balanced to a pH of 7.6.

In yet another aspect the invention is a pool protecting and surface cleansing substance comprising a mixture of benzalkonium chloride and an inert liquid, such as soft water balanced to a pH of 7.6. This pool protecting and surface cleansing substance is intended for use primarily in pools having plaster surfaces. This substance protects the plaster surface of a pool during a conventional acid wash and also reduces the acid fumes to which the person applying the acid wash is exposed. It also aids in cleaning oils and scums from the plaster surface.

Another aspect of the invention is a method of removing cobalt stains from fiberglass comprising mixing a quantity of a mixture of benzalkonium chloride, EDTA Na4 and soft water in a quantity of muriatic acid and washing the fiberglass therewith. Preferably the quantities of the cleanser and muriatic acid are poured onto the fiberglass surface and rinsed therefrom with water under pressure. Cobalt stains may be removed from any fiberglass finish, including acrylic, gel coat and painted finishes. Scum, scale, oils and other foreign matter are also removed in the process.

The manufacture of the compositions of the invention and the methods of use thereof may be illustrated with several examples.

EXAMPLE I

Fifty gallons of a cobalt stain remover according to the invention may be manufactured in the following manner. Forty gallons of soft water are placed in a fifty-five gallon fiberglass drum. The soft water is balanced to a pH of 7.6. A quantity of Hamprene 220 (EDTA Na4) is added to the water. The Hamprene 220 has a specific gravity of 1.00 and a pH of 11.00. Between about 1% and about 12% by weight of Hamprene 220 is utilized. If less than 1% is employed, the effectiveness of the stain remover is reduced. If more than 12% Hamprene 220 is utilized, the mixture becomes too soupy to work with conveniently. Preferably, the stain remover is comprised of about 1.56% EDTA Na4.

About six pounds of Hamprene 220 are poured into the soft water and continuously mixed therein until the Hamprene 220 is totally dissolved. Thereafter, a quantity of Barquat MB-50 (benzalkonium chloride) is added to the mixture. The stain remover is preferably formed of between about 2% and about 10% Barquat MB-50. If too little Barquat MB-50 is utilized, the stain remover becomes insufficiently effective. If too much Barquat MB-50 is employed, the stain remover foams excessively and become difficult to work with. Preferably, the stain remover is comprised of benzalkonium chloride to the extent of about 4% by weight.

The Barquat MB-50 is mixed into the contents of the fiberglass drum and dissolved. Stirring is continued for about five minutes further. Thereafter, an additional amount of soft water is added to bring the total contents of the drum to fifty gallons. The contents of the drum may be conveniently packaged in 16 ounce containers.

To remove cobalt stains from a fiberglass spa or pool the spa or pool must first be drained using a submersible pump. For best results, a water hose should be left on in the spa or pool and the pump should be allowed to continue to run.

The stain remover is then mixed with a quantity of muriatic acid. In spas the recommended portions are 16 ounces of the stain remover to one gallon of muriatic acid. Stain remover in this quantity serves to thin the acid, as it is believed by some that the acid tends to attack the fiberglass surface. For a fiberglass pool, a mixture of 8 fluid ounces of the stain remover in one gallon of muriatic acid provides a sufficient amount of stain remover. Since the mixture is typically applied over a much greater surface area, there is no reason to thin the acid as in cleaning a spa.

The stain remover and muriatic acid are mixed in a plastic pail. The solution is carefully poured onto the wall of a fiberglass spa or pool. Difficult spots may require brushing of the surface in order to totally remove the cobalt stains. The stain removing mixture is then washed off with water under pressure from the garden hose and pumped out of the unit.

EXAMPLE II

To formulate a pool water treatment substance, forty gallons of soft water are placed at room temperature in a fifty-five gallon fiberglass drum. The water used is preferably balanced to a pH of 7.6. It is then necessary to add a quantity of Hamprene 220 (EDTA Na4) to the water. The quantity may preferably range between about 4% and 30% by weight of the total quantity of pool water treatment substance produced. Preferably, the pool water treatment substance is comprised of Hamprene 220 to the extent of about 12.5% by weight.

To achieve the preferred concentration of Hamprene 220 sixty-five pounds of Hamprene 220 are slowly added to the water while continuous stirring. Mixing is continued until the Hamprene 220 is completely dissolved.

The next step in the formulation of the pool water treatment substance is the addition of a quantity of Barquat MB-50 (benzalkonium chloride). This material is preferably added to comprise between about 0.5% and about 4% of the total weight of the pool water treatment substance. Preferably, the Barquat MB-50 forms about 1.5% of the weight of the pool water treatment substance.

To achieve the preferred concentration thirteen pounds of Barquat MB-50 are added and mixed thoroughly in the contents of the drum. While still mixing, a quantity of a material sold as Algydyn by the United States Movidyn Corporation, located at 863 North Orleans Street, Chicago, Ill. 60610, is added. The Algydyn product contains 80% colloidal silver in elemental form. The pool water treatment substance is preferably formulated to comprise between about 0.08% by weight and about 0.16% by weight of colloidal silver. To achieve a still further preferred concentration of 0.0016% colloidal silver, 12⅔ ounces of Algydyn product are added to the drum.

Once the Algydyn product has been added, mixing is continued for another five minutes.

It is frequently desirable to impart a characteristic color to the pool water treatment substance. Preferably the pool water treatment substance is comprised of no more than about 0.0001% by weight of a Keyacid dye. Accordingly, two ounces of Keyacid BRN -301-014-600 are added. The Keyacid BRN may be obtained from the Keystone Ingham Corporation, located in Santa Fe Springs, Calif. The Keyacid BRN is a brownish-red dye.

Mixing is continued while the Keyacid dye is added. Thereafter, the liquid in the drum is brought to the fifty gallon mark with the addition of more soft water. Mixing is continued for approximately two more minutes. The pool water treatment substance, formulated as described, is then ready for use.

When the pool water treatment substance is used as a normal maintenance chemical, it will prevent cobalt stains from forming on any fiberglass spa or pool. Moreover, it will neutralize the strong chlorine smell and reduce the harsh body and hair condition that results from immersion in a pool or spa containing high levels of chlorine. The pool water treatment substance is particularly effective in commercial pools and spas where high levels of chlorine are needed. Furthermore, it is compatible with all chemicals normally used in pools and spas. It serves as an excellent water clarifier and water freshener.

When a pool is first filled, 32 fluid ounces of the pool water treatment substance, formulated as described in this example, are added to every 10,000 gallons of water in the pool. Thereafter, 8 ounces of the substance are added to every 10,000 gallons of water in the pool once a week. For spas, 16 ounces of the pool water treatment substance are added to the spa contents when the spa is first filled. Thereafter, 4 fluid ounces are added to the spa every two weeks.

When the pool water treatment substance, formulated as described herein, is used in the manner described, it will prevent the formation of cobalt stains on any fiberglass pool or spa. It is beneficial to the water in any swimming pool or spa because it clarifies and freshens the water and removes the chlorine harshness. That is, it removes the chloramines which are ineffective in combating algae and bacteria, but does not interfere with the germicidal and bactericidal properties of the active chlorine in the pool.

EXAMPLE III

A pool protecting and surface cleansing substance which is useful in plaster pools as well as fiberglass pools may also be formulated. Such a pool protecting and surface cleansing substance is comprised of a mixture of benzalkonium chloride and an inert liquid. The substance is preferably comprised of between about 4% and about 10% benzalkonium chloride by weight. The preferred formulation is comprised of benzalkonium chloride to the extent of about 5.05% by weight.

Forty gallons of soft water balanced to a pH of 7.6 are added to a fiberglass drum. While continuously stirring the water, forty-five pounds of Barquat MB-50 (benzalkonium chloride) are added to the water. Mixing is continued for five minutes.

It is sometimes desireable for the pool protecting and cleansing substance to have a characteristic color. This is achieved by the addition of a coloring agent, the concentration of which is preferably present to the extent of about 0.0002%. To impart a characteristic color, two ounces of a blue dye, such as Keyacid Brill, No. 201-080-505, sold by the Keystone Ingham Corporation, may be added while stirring. The contents of the drum are brought to fifty gallons by the addition of further soft water, and mixing is continued for two more minutes. The pool protecting and surface cleansing substance thus formulated is then ready for use.

The pool protecting and surface cleansing substance as formulated in this example is designed for use in performing an acid wash of a plaster pool, although the substance can also be used on fiberglass pools.

In conventional practice, plaster pools are periodically washed with acid to remove stains and to clean the pool surfaces. However, after about four or five acid washes, conventional plaster pools require resurfacing. With the pool protecting and surface cleansing substance as formulated in this example, however, acid washes can be repeated indefinitely without resurfacing. Furthermore, the pool protecting and surface cleansing substance of this example cuts the acid fumes to which the user is exposed and also acts as a cleansing agent. It is particularly helpful in cleaning oils and scums from around the tile line of a pool.

Prior to conducting an acid wash of a plaster pool, 8 ounces of the pool protecting and surface cleansing substance as formulated in this example are added to one gallon of muriatic acid in a plastic pail. An additional half gallon of water is thereafter added. The mixture of the substance of this example and the muriatic acid are poured onto the plaster surface of the pool or spa to be cleaned. The substance will dissolve stains, oils and scums from the plaster surface of the pool or spa. The cleanser is then hosed off and drained as waste water.

The exemplary formulations described herein are merely illustrative, as it is to be understood that numerous variations and modifications of the stain remover, pool water treatment substance and pool protecting and surface cleansing substance of the invention will become readily apparent to those familiar with swimming pool and spa maintenance. Accordingly, the scope of the invention should not be construed as limited to the specific examples and methods of use described, but rather is defined in the claims appended hereto.

I claim:
1. A method of removing cobalt stains from fiberglass comprising mixing a quantity of a mixture of benzalkonium chloride, EDTA Na4 and soft water in a quantity of muriatic acid and washing said fiberglass therewith.
2. A method according to claim 1 further comprising brushing said mixture of said quantities onto said fiberglass and rinsing them therefrom with water under pressure.

* * * * *